(12) United States Patent
Jansson et al.

(10) Patent No.: US 9,855,609 B2
(45) Date of Patent: Jan. 2, 2018

(54) TOOL FOR CHIP REMOVING MACHINING AND AN INSERT-HOLDING BLADE AS WELL AS A KEY THEREFOR

(71) Applicant: SANDVIK INTELLECTUAL PROPERTY AB, Sandviken (SE)

(72) Inventors: Gunnar Jansson, Sandviken (SE); Anders Breisch, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 684 days.

(21) Appl. No.: 14/316,886

(22) Filed: Jun. 27, 2014

(65) Prior Publication Data

US 2015/0003924 A1 Jan. 1, 2015

(30) Foreign Application Priority Data

Jun. 28, 2013 (SE) ...................................... 1350796

(51) Int. Cl.
   *B23B 27/16* (2006.01)

(52) U.S. Cl.
   CPC .......... *B23B 27/16* (2013.01); *B23B 2205/02* (2013.01); *B23B 2205/125* (2013.01); *B23B 2260/0785* (2013.01); *Y10T 407/2288* (2015.01)

(58) Field of Classification Search
   CPC ................ B23B 27/04; B23B 2205/02; B23B 2260/078; B23B 2260/0785
   See application file for complete search history.

(56) References Cited

U.S. PATENT DOCUMENTS

| 3,175,426 | A | * | 3/1965 | Kolesh | .................. | B23D 61/06 |
| | | | | | | 76/80 |
| 5,035,545 | A | * | 7/1991 | Zinner | .................... | B23B 27/04 |
| | | | | | | 407/108 |
| 5,315,908 | A | | 5/1994 | Mihic | | |
| 5,743,680 | A | * | 4/1998 | Von Haas | ............... | B23B 27/04 |
| | | | | | | 407/110 |
| 5,803,675 | A | * | 9/1998 | Von Haas | ............... | B23B 27/04 |
| | | | | | | 407/107 |
| 5,921,724 | A | | 6/1999 | Erickson et al. | | |
| 6,065,906 | A | * | 5/2000 | Hansson | ................. | B23B 27/04 |
| | | | | | | 407/107 |
| 6,241,429 | B1 | * | 6/2001 | Schafer | .................. | B23B 27/04 |
| | | | | | | 407/102 |

(Continued)

FOREIGN PATENT DOCUMENTS

| CN | 1104138 A | 6/1995 |
| CN | 1473082 A | 2/2004 |
| WO | 89/10224 A1 | 11/1989 |

*Primary Examiner* — Will Fridie, Jr.
(74) *Attorney, Agent, or Firm* — Corinne R. Gorski

(57) ABSTRACT

A parting tool is in the form of a blade and a replaceable cutting insert, as well as, a key having an eccentric body. The cutting insert may be clamped in a seat under an elastic, resilient clamping finger. In the blade, a keyhole is formed, into which the eccentric body can be inserted. In the keyhole, there are included concave sliding surfaces, which border on a flat stop surface. With these, convex corner surfaces and flat shoulder surfaces on the eccentric body can interact. By the unique design of the keyhole and eccentric body, a gentle interaction between the surfaces is obtained, which guarantees a long service life of the blade, as well as the key.

11 Claims, 7 Drawing Sheets

(56) References Cited

U.S. PATENT DOCUMENTS

| | | | |
|---|---|---|---|
| 6,454,498 B1 * | 9/2002 | Hansson | B23B 27/04 407/110 |
| 6,579,044 B1 | 6/2003 | Trenkwalder et al. | |
| RE43,534 E * | 7/2012 | Friedman | B23B 27/04 29/426.5 |
| 9,242,300 B2 * | 1/2016 | Kaufmann | B23B 27/1666 |
| 9,475,122 B2 * | 10/2016 | Andersson | B23B 27/045 |
| 2002/0054792 A1 * | 5/2002 | Hansson | B23B 27/04 407/72 |

* cited by examiner

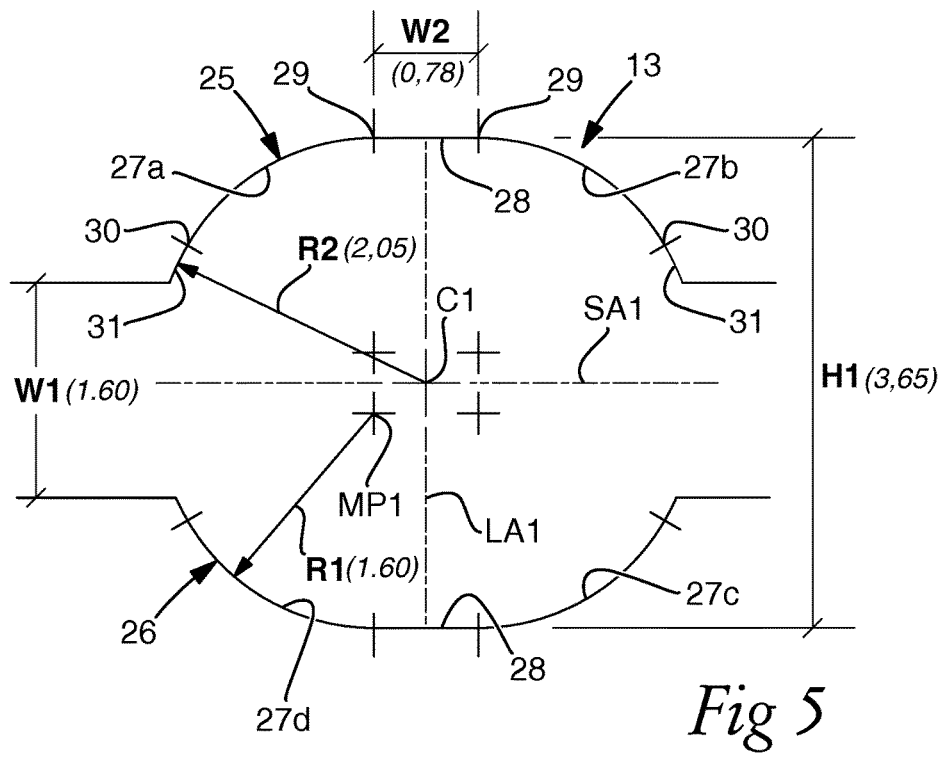
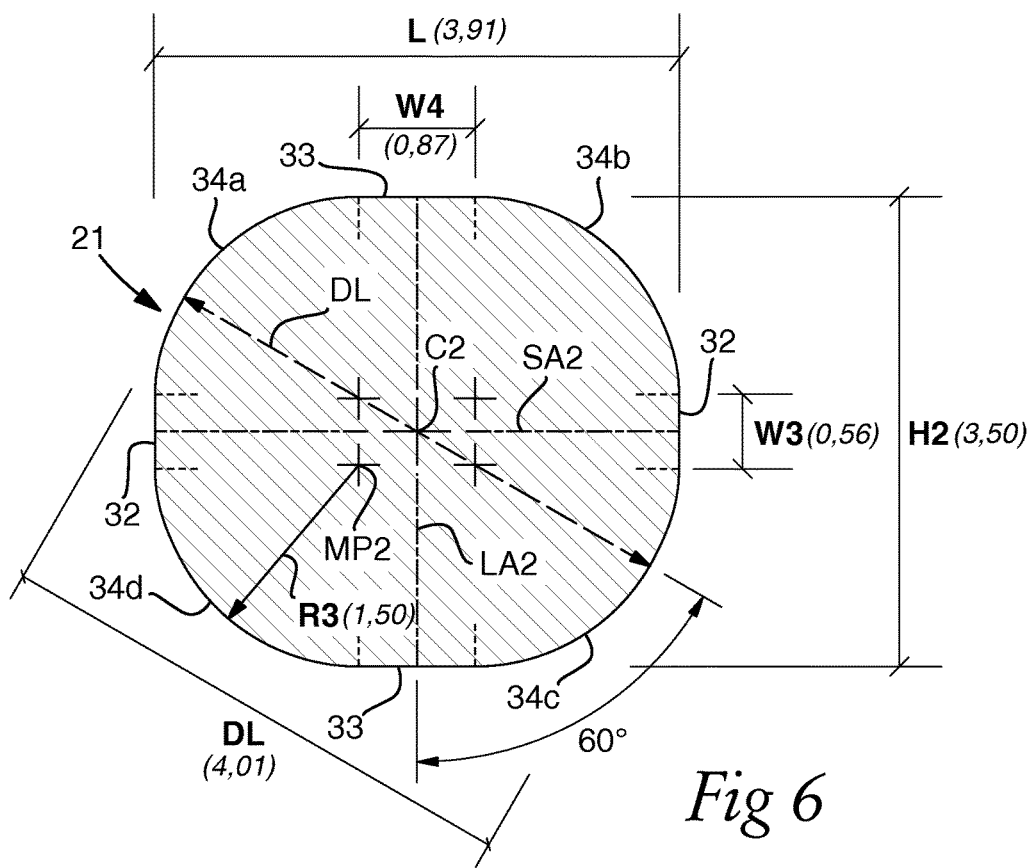

TOOL FOR CHIP REMOVING MACHINING AND AN INSERT-HOLDING BLADE AS WELL AS A KEY THEREFOR

RELATED APPLICATION DATA

This application claims priority under 35 U.S.C. §119 to Swedish Patent Application No. 1350796-7, filed on Jun. 28, 2013, which the entirety thereof is incorporated herein by reference.

TECHNICAL FIELD

In a first aspect, a tool intended for chip removing machining has a blade in which there is formed a seat intended for the receipt of a replaceable cutting insert and delimited between a bottom support and an elastically resilient clamping finger. The clamping finger is spaced-apart from the rest of the blade via a slit delimited by upper and lower interfaces and running from the seat. The slit mouths in a keyhole for the receipt of an eccentric body, which is included in a key and has the purpose of turning out the clamping finger while expanding the seat against the action of an inherent elasticity of the material of the blade. The keyhole includes upper and lower recesses, which are defined by edge surfaces, in which there are included concave, arched sliding surfaces, along which round, convex corner surfaces on the eccentric body can move between positions in which the seat is widened or narrowed, respectively.

A second aspect relates to an insert-holding blade as such, and a third aspect, to a key for the tool.

BACKGROUND

Tools of the type generally mentioned above are used for chip removing or cutting machining of work pieces of metal or the like materials, e.g. composites. A usual machining method is turning, above all in the form of grooving or parting operations, during which the cutting insert is fed radially in a work piece rotating on a center axis while forming a circumferential groove in the same. In grooving, the cutting insert is inserted to a moderate depth in the work piece, while parting requires that the cutting insert is inserted to the vicinity of the center axis. However, the tool may also be mounted in rotatable milling cutters having the purpose of providing straight slots in, for instance, a flat surface of a work piece. In both cases, however, it is required that the blade serving as a holder for the cutting insert has a thickness that is less than the width of a front main cutting edge of the cutting insert, which determines the width of the groove, because otherwise the blade would not clear from the generated surfaces that delimit the groove. As a consequence of their practical application, the tools in question are commonly denominated "parting tools".

In this connection, it should be mentioned that the replaceable cutting insert is usually manufactured from cemented carbide or some equivalent material having large resistance to wear, while the holding blade is manufactured from steel of a suitable equality. The last-mentioned material has—contrary to cemented carbide—a certain inherent elasticity, which can be utilized to clamp the cutting insert in the seat of the blade.

Parting tools of the kind in question have for a long time been the subject of a progressive development, which has resulted in a large number of construction solutions, several of which make use of self-tensioning clamping or tightening fingers (see, e.g., U.S. Pat. Nos. 5,803,675, 6,241,429, 5,921,724, and 6,579,044). In such tools, the inherent elasticity of the steel of the blade is utilized by holding, in the active state of the tool, the cutting insert resiliently pressed against the bottom support, i.e., without the help of any particular lock member. In order to make the clamping finger self-tensioning, the seat is given an undersize in relation to the thickness of the cutting insert, while an oversize is established by the clamping finger being forced to turn out to an outer position, in which the cutting insert clears. In practice, the undersize and oversize, respectively, may be very moderate and still guarantee a rigid fixation of the cutting insert as well as smooth insert replacements. Thus, in practice, the undersize may be within the range of 0.1-0.2 mm, while the oversize does not need to be more than some hundredths of a millimeter. As a consequence of the tools not relying on particular lock members, such as screws, the retention of the cutting insert becomes reliable, e.g. by the fact that they do not become sensitive to vibrations.

The design of the present tools with self-tensioning clamping fingers, involves, however, a delicate balance between several, most often conflicting demands and desires. On one hand, the spring force of the clamping finger should be sufficiently large to reliably clamp the cutting insert in an exact, predetermined position, but, on the other hand, the spring force must not be so great that the replacement of the cutting insert is too difficult. Furthermore, it is desirable that the holder blade has a long service life. For this reason, the clamping finger should maintain its spring force also after multiple insert replacements. Thus, in practice, at least 80 to 100 replacements should be possible without the spring force being lost. Neither should the clamping finger, in connection with insert replacements, be subject to such a great turning-out force that the yield strength of the steel is exceeded, because then the deformation of the steel may become plastic rather than elastic.

Another factor is the so-called weak section of the blade, i.e., the section along the blade that has the smallest moment of inertia and that therefore most easily is deformed under load by the cutting forces. If the material of the blade would be reduced to too high an extent in the weak section, e.g. as a consequence of an incorrectly dimensioned and/or misplaced hole, the weak section will be dangerously weak. Neither should the material portion in which the steel is deformed to establish the elastic tightening force be too weak (=poor tightening force) or too strong (=excessive deflection force). In other words, not only the seat and the slit/keyhole, but also a possible rear slit for a material-weakening hole, should have an optimized (i.e., neither too large nor too small) area, as well as an optimized location in the blade. A further—and for the user an essential desire—is that the key necessary for insert replacements, and the interacting keyhole, should be of such a nature that the opening and locking, respectively, positions of the key, should be possible to be perceived in a tactile and/or auditive way, rather than visual. Thus, in practice, in the present environment, it is difficult or impossible for the operator to see with the naked eye whether the key has been rotated e.g. 90° between opening and locking positions, in particular if the environment of the tool is occupied by hiding objects.

U.S. Pat. No. 5,803,675 discloses a tool of the initially generally mentioned kind, more precisely in the form of a turning tool having a self-tensioning clamping finger, which can be turned out toward an opening position by means of a key having an eccentric body, which is insertable into a keyhole in the blade. The eccentric body of the key has a markedly elongate or rectangle-like cross-sectional shape (also described as "elliptical" in the publication), which is defined by two flat and parallel no long sides and two short sides having a convex shape. In the keyhole, an upper recess is included, which is delimited by a front, concave sliding surface as well as a central, concave intermediate surface having a smaller radius of curvature, which extends between two sharp edges. When the eccentric body of the key is rotated 90° from an initial position, one of the two convex contact surfaces will be applied against the sharp edges thereof, more precisely with the purpose of retaining the key in an opening state.

One of several disadvantages of the tool known by U.S. Pat. No. 5,803,675 is that the interaction between the key and the keyhole is inferior. Thus, the elongate cross-sectional shape of the eccentric body of the key is determined by a major axis, which is considerably greater than the minor axis thereof. In the exemplified geometry of the keyhole and the eccentric body, respectively, this means that sufficient deflection of the clamping finger becomes very force-consuming (if even possible). In other words, there is an obvious risk of the deformation of the bending zone of the clamping finger will be plastic rather than elastic. Another disadvantage is due to the sharp edges on both sides of the central intermediate surface in the upper recess of the keyhole. When the eccentric body is rotated repeated times between opening and locking positions, these edges lead to a quick wear-out of not only the abutting convex surface on the eccentric body, but also of the proper edges. Therefore, if the dimensions of the eccentric body would—hypothetically—be modified, e.g. by the shortening of said major axis, in order to render a realistic oversize upon opening (less than 1% or 0.05-0.1 mm), the sharp edges in the upper recess of the keyhole will rapidly alter the small dimensional differences that are required to retain a moderate over or opening measure during many insert replacements. In other words, the interacting blade of the tool and the key get a limited service life. In this connection, it should be mentioned that the market requires at least 80 insert replacements without substantially impaired function.

SUMMARY

The present disclosure aims at obviating the above-mentioned shortcomings of the known tool and at providing an improved tool of the kind in question. Therefore, one of the objects is to provide a tool, which allows a gentle interaction between the keyhole in the blade of the tool and the key that is used to readjust the clamping finger between locking and opening positions, all with the purpose of giving the tool a long service life. In this connection, the operator should obtain a distinct—tactile and/or auditive—perception that the key assumes its opening position. Furthermore, the key should reliably be able to remain in its opening position during the period of an insert replacement. From the opening position, the key should furthermore be possible to be brought back to its locking position by a conscious motion from the side of the operator, wherein also the locking motion should be clearly perceptible in an auditive or tactile way.

A further object is to provide a tool, which requires a minimal power consumption upon adjustment of the clamping finger, but in spite of this guarantees a reliable clamping of the cutting insert in the appurtenant seat. Also, the disclosure aims at providing a tool, which allows that the eccentric body of the key can be applied in different positions in the keyhole and be rotated in several different directions in connection with the adjustment of the clamping finger.

In accordance with a fundamental feature, the most important of the above-mentioned objects is attained by the fact that at least one of the concave sliding surfaces of the keyhole borders on a flat stop surface, which has a width that is smaller than the radius of curvature of the individual sliding surface, and against which a flat shoulder surface of the eccentric body bordering on a convex corner surface can be pressed in the widened state of the clamping finger.

By the fact that the interacting surfaces on the eccentric body and in the keyhole are convex surfaces, which border on flat surfaces—without any sharp edges—gentle relative motions are obtained between the surfaces while minimizing the risk of wear damage to the same. Furthermore, by interaction between a flat stop surface in the keyhole and a likewise flat shoulder surface on the eccentric body of the key, the key can be reliably retained in its opening position in connection with insert replacements.

In one embodiment, the edge surface of at least one recess in the keyhole includes two concave sliding surfaces of identical, although mirror-inverted shape on both sides of the stop surface, and the eccentric body includes two convex corner surfaces of identical, although mirror-inverted shape on both sides of the flat shoulder surface, the convex shape of the corner surfaces being defined by circular arcs, the mid-points of which are spaced apart from a geometrical center, around which the eccentric body is rotatable. In such a way, the eccentric body can be rotated at least 180°—and preferably 360°—whereby the key can be applied in several different positions in the keyhole.

In a further embodiment, not only one, but both edge surfaces of the keyhole recesses include a flat stop surface and two concave sliding surfaces, which are situated on both sides of the same and have identical, although mirror-inverted shape, and the eccentric body has a cross-sectionally elongate or rectangular basic shape, which is defined by a major axis, which is running between two short sides having shoulder surfaces, and a minor axis, which is running between two long sides, the axes intersecting each other in a center, from which all four convex corner surfaces are equidistantly spaced apart, and the distance between the flat shoulder surfaces along the short sides being, on one hand, greater than the distance between the two stop surfaces of the keyhole, when the clamping finger is unloaded, but, on the other hand, smaller than the distance between two end points on a diagonal, where the eccentric body has its cross-sectionally greatest extension. In this embodiment, the eccentric body—regardless of from which side of the blade the same is applied in the keyhole—may optionally assume one of four positions, besides which a clearly perceptible "click" in the blade is produced, when the clamping finger, from a maximum opening position determined by said diagonal, is switched into a position of rest, when the shoulder surface abuts against the stop surface and when the opening measure of the seat is somewhat smaller than the maximal.

In the last-mentioned embodiment, the length of the major axis between two opposite shoulder surfaces may be at most 20% greater than the length of the minor axis between the long sides. In such a way, the cross-sectional area of the eccentric body and thereby the size of the keyhole is reduced to an absolute minimum without the required spring force of the clamping finger for that reason becoming too small.

In the same embodiment, the length of the diagonal may advantageously be at most 5% greater than the length of the major axis. In such a way, the maximal opening measure will only be just slightly greater than the opening measure in the position of rest, in which insert replacement can be carried out.

In a further embodiment, the keyhole transforms via a second, rear slit into a circular hole having the purpose of weakening the blade in a zone, in which bending of the clamping finger should occur, a mid-point of the hole being situated on a higher level than the center of the keyhole. By in this way locating the weakening hole comparatively high in the blade, the blade retains good strength in its weak section.

In a second aspect, the present disclosure also relates to an insert-holding blade as such.

A third aspect of the present disclosure relates to a key as such.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE APPENDED DRAWINGS

In the drawings:

FIG. 5 is an enlarged, schematic of the geometrical shape of the keyhole in unloaded state.

FIG. 6 is a cross section showing the cross-sectional shape of an eccentric body included in the key.

DETAILED DESCRIPTION OF A PREFERRED EMBODIMENT OF THE INVENTION

Figure 1:
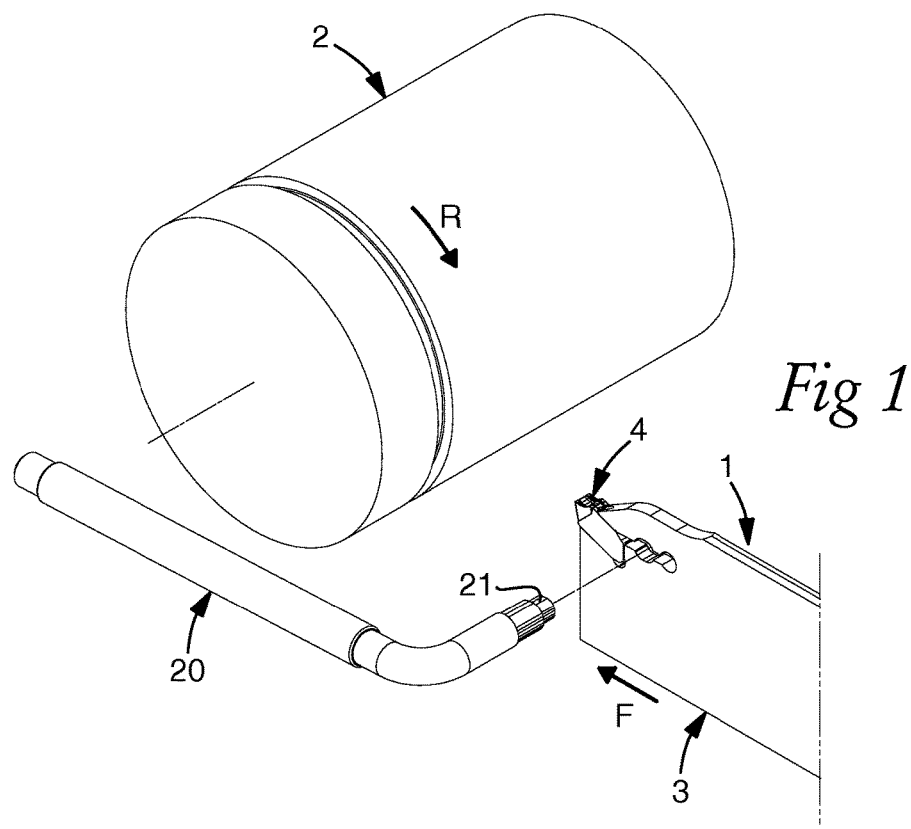
FIG. 1 is a perspective exploded view showing a tool formed in accordance with the present disclosure in connection with the turning of a groove in a work piece.

In FIG. 1, a tool 1 in accordance with the present disclosure is shown in connection with the machining of a work piece 2. The tool is in the form of a turning tool, the main component of which consists of a blade 3, which serves as a holder or basic body for a replaceable cutting insert 4. The work piece 2 is cylindrical and rotatable in the direction of rotation R. By longitudinally feeding the tool 1 in the feeding direction F during simultaneous rotation of the work piece, in the envelope surface of the same, a circumferential groove 5 can be provided, the width of which is determined by the width of a main cutting edge included in the cutting insert 4, while its depth is determined by how far the blade and its cutting insert are fed into the work piece. The machining method illustrated in FIG. 1 is a grooving operation.

Figure 2:
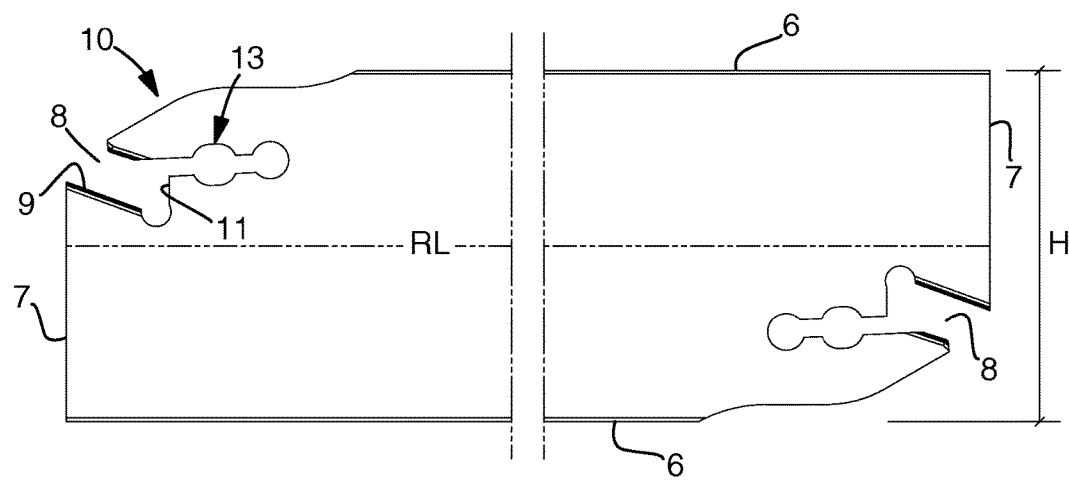
FIG. 2 is a sectioned side view of a blade according to the disclosure serving as insert holder.

In FIG. 2, it is shown how the insert-holding blade 3 in the example has an elongate, rectangular basic shape by being delimited by two longitudinal parallel side edges 6 and two transverse side edges 7, which form the ends of the blade. In two diagonally opposite corners, seats 8 are formed, in which a cutting insert 4 can be detachably mounted. The reason for the blade in this case including two seats is that the same should be mountable in a block (not shown) and be turned so that either one or the other seat assumes the operative state, which is shown in FIG. 1. The individual seat 8 is delimited between a bottom support 9 and a clamping or tightening finger generally designated 10 (see also FIGS. 3 and 4). An inner stop face 11 serves as a support to a rear end of the cutting insert and determines the axial position of the cutting insert in relation to the seat. From the seat 8, a slit 12 extends, which mouths in a keyhole generally designated 13. In the example shown, the keyhole 13 transforms into a second slit 14, which in turn mouths in a circular hole 15. This hole 15 has the purpose of weakening the blade in a zone designated 16, in which the clamping finger 10 yields elastically upon deflection. In order to facilitate the following description of the tool, a reference line RL is shown in FIGS. 2 and 4, which is parallel to the longitudinal side edges 6 and situated halfway between the same.

Figure 3:
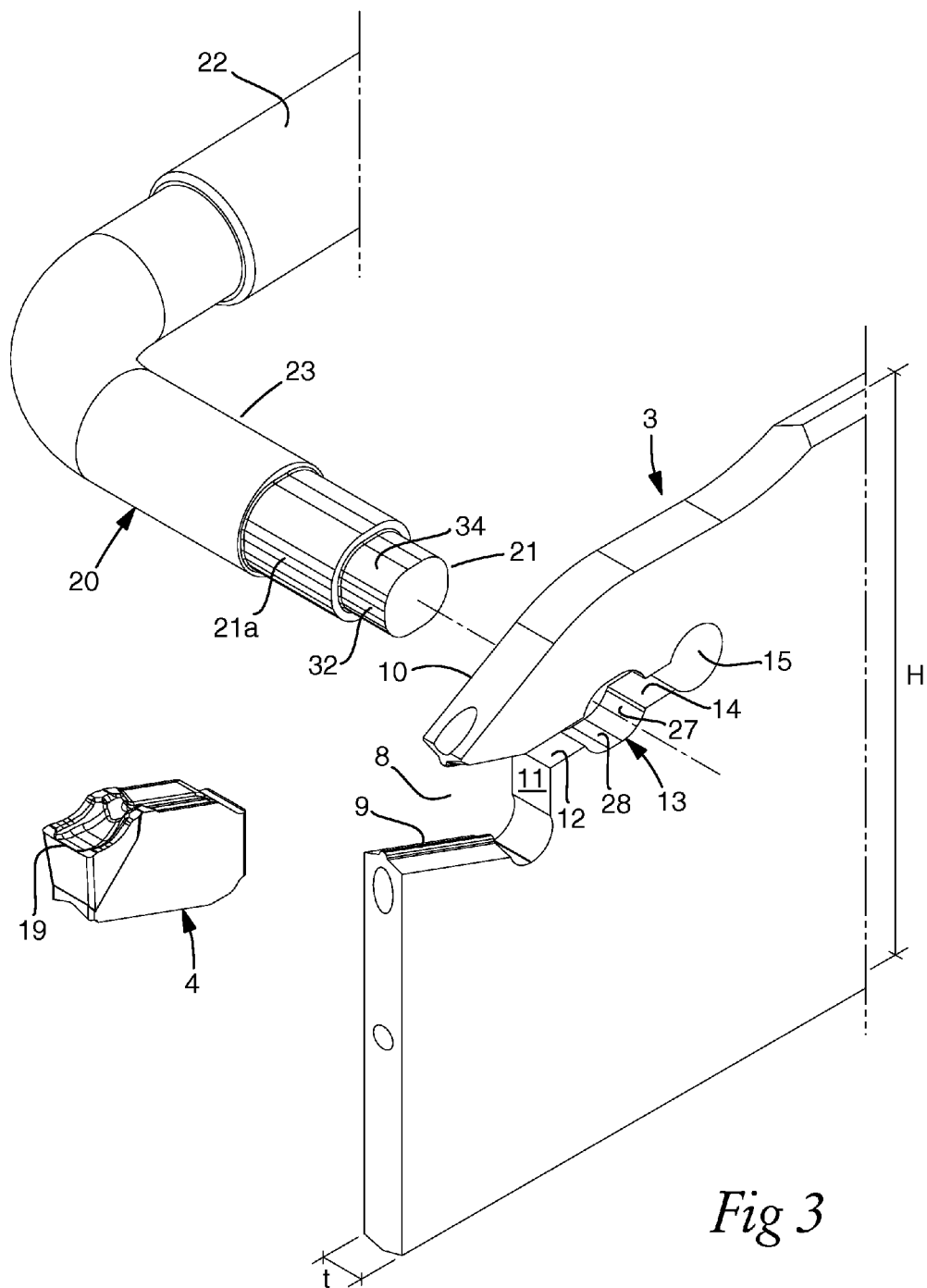
FIG. 3 is an enlarged, perspective exploded view showing a front part of the holder blade, as well as a replaceable cutting insert and a key.
Figure 4:
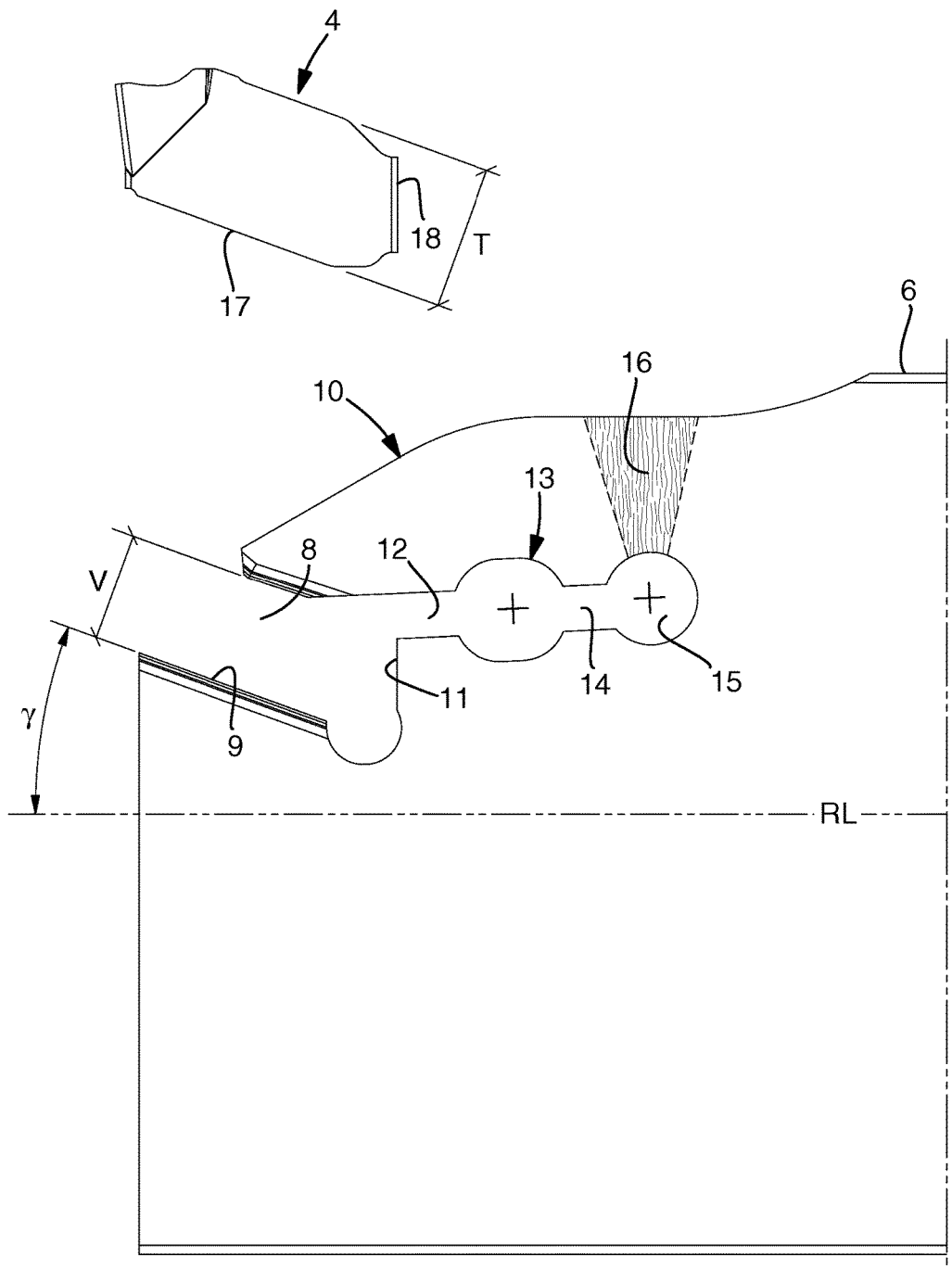
FIG. 4 is an exploded side view of the front part of the holder blade as well as the cutting insert.

As seen in FIG. 4, the bottom support 9 of the seat 8 is inclined at an angle γ in relation to the reference line RL. In the example, γ amounts to 20°, the stop face 11 extending at, or at least approximately at, an angle of 90° to RL. To this geometry, the cutting insert 4 is adapted so far that an under side 17 of the cutting insert forms an angle of 70° with the rear end surface 18, which is pressed against the stop face 11. With reference to FIG. 3, it should further be mentioned that the width of a front main cutting edge 19 of the cutting insert is somewhat greater than the thickness t of the blade in order to, in the usual way, guarantee that the surfaces that delimit the groove 5 clear from the blade.

In addition to the blade 3 and the cutting insert 4, the complete tool also includes a key 20, by means of which the clamping finger 10 can be turned out while expanding the seat 8. The nominal width of the seat, when the clamping finger 10 is unloaded, is designated V in FIG. 4, while the analogous thickness of the cutting insert 4 is designated T. In order to attain the required tightening force in the clamping finger, the seat has to have a certain undersize in relation to the cutting insert, i.e., V has to be generally less than T. In practice, this difference may amount to the order of 0.1-0.2 mm. In order to, on the other hand, allow replacement of cutting inserts, the clamping finger has to be possible to be turned out so that the seat obtains a certain oversize in relation to the cutting insert (V>T). In practice, this oversize may be as small as 0.05-0.10 mm. The desired spring force is attained by means of an under size of 0.15 mm at the same time as an oversize of 0.05 mm allows smooth insert replacements. Then the clamping finger needs to be turned out so far that the width V of the seat is increased by 0.20 mm from the position in which the seat is empty and the clamping finger unloaded.

In order to turn out the clamping finger, a key 20 shown in FIGS. 1 and 3 is used, in which there is included an eccentric body 21 formed in accordance with the disclosure. In the example, the key is a so-called L-key of the type that includes a comparatively long, grippable branch 22 as well as a shorter branch 23, which is right-angled against the same and in which the eccentric body 21 is included. For the same purpose, a T-key may also be used, i.e., a key, the branch of which has an eccentric body at its one end and a transverse handle at the opposite end.

Figure 7:
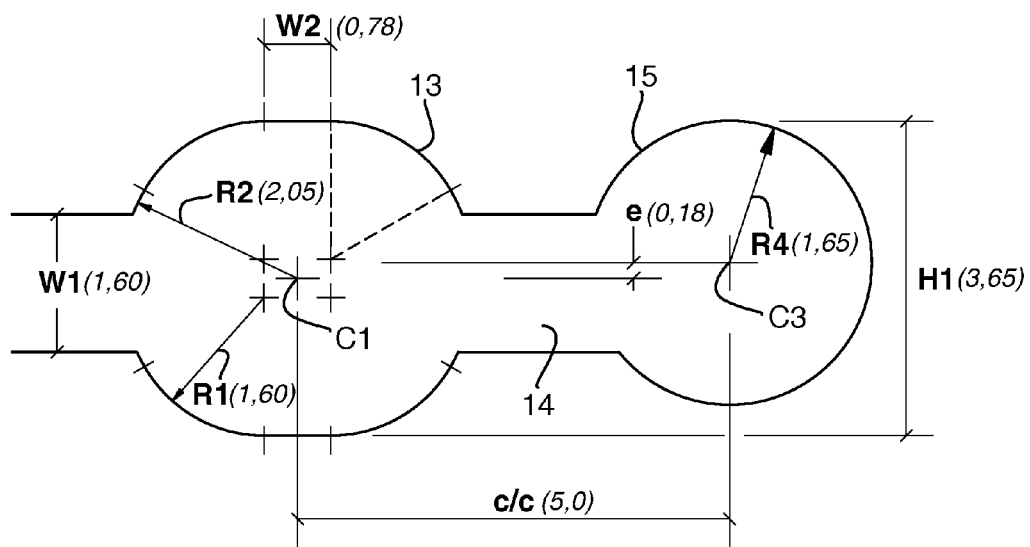
FIG. 7 is a side view showing the keyhole as well as a circular hole positioned behind the same, having the purpose of weakening the blade in the area of the bending zone of the clamping finger.

Reference is now made to FIGS. 5-7, which illustrate the geometrical design of the keyhole 13 and the eccentric body 21 of the key, respectively. As seen in FIGS. 5 and 7, the keyhole 13 includes upper and lower recesses, which are defined by edge surfaces, in which arched, concave sliding or bearing surfaces 27a, 27b, 27c and 27d are included. The keyhole has—in the example—a generally elongate cross-sectional shape, which is defined by a major axis SA1 and a minor axis LA1, which intersect each other at a point C1, which forms a center of the keyhole. Between the pairs of concave sliding surfaces 27a, 27b and 27c, 27d, respectively, in the respective recess, a flat surface 28 extends, which henceforth is denominated stop surface. The individual, concave sliding surface is defined by a circular arc, the ends of which are designated 29, 30, and the mid-point of which is designated MP1, while the radius of curvature is designated R1. In the example, the concave sliding surface transforms directly into the stop surface 28 in so far that the last-mentioned one forms a tangent to the circular arc. As is clearly seen in FIG. 5, the mid-point MP1 of the circular arc is eccentrically situated in relation to the center C1 of the keyhole. More precisely, the same is spaced apart from the major axis SA1 as well as from the minor axis LA1. At its end 30 positioned closest to the major axis SA1, the individual sliding surface transforms into a likewise concave, arched transition surface 31. This transition surface has a greater radius R2 and has its mid-point situated in the center C of the keyhole.

In order to facilitate an overview concerning the dimensions of the key and of the keyhole, the concrete measures that determine the shape and the dimensions of a prototype embodiment have been indicated in millimeters within parenthesis in the drawings. It should particularly be noted that the height H1 of the keyhole 13, as this is represented by the distance between the flat stop surfaces 28, in the example amounts to 3.65 mm. It should also be noted that the aforementioned gap 12 has a width or height W1 amounting to 1.60 mm. Furthermore, in this case, the width W2 of the individual stop surface 28 amounts to 0.78 mm.

Also the eccentric body 21 shown in FIG. 6 has a generally elongate cross-sectional shape, which may be described as rectangular having four considerably rounded corners. Thus, a major axis SA2 extends between two opposite, flat shoulder surfaces 32, while a minor axis LA2, which intersects the major axis in a center C2, extends between two flat surfaces 33, which are mutually parallel and may be said to form the long sides of the rectangle, while the shoulder surfaces 32 form short sides. Between the pairs of flat surfaces 32, 33, four convex corner or contact surfaces 34a, 34b, 34c and 34d extend, which can slide along the sliding surfaces 27, when the key is rotated. In the example, the major axis SA2 has a length L between the shoulder surfaces 32 that amounts to 3.91 mm. The height H2, as this is represented by the distance between the opposite flat surfaces 33 (the long sides), simultaneously amounts to 3.50 mm. Thus, a comparison between FIG. 5 and FIG. 6 proves that the height H2 of the eccentric body is somewhat smaller (0.15 mm) than the height H1 of the keyhole. On the other hand, the length L of the eccentric body is greater than the height H1 of the keyhole. More precisely, L differs from H1 by 0.26 mm (3.91-3.65). In other words, the length L is approx. 12% greater than the height H2. In practice, this relationship between length and height may vary upward as well as downward. However, L should be at most 20% greater than H2. On the other hand, L should amount to at least 5% of H2.

The convex corner surfaces (34a-34d) of the eccentric body 21 are, like the concave sliding surfaces (27a-27d), circular arc-shaped and have their mid-points MP2 eccentrically situated in relation to the center C2 of the eccentric body. In the example, the individual corner surface 34 has a radius R3 that is somewhat smaller than the radius R1 of the interacting, concave sliding surface 27. In this embodiment, R3 amounts to 1.50 mm, while R1 amounts to 1.60 mm. Also in this case, the flat shoulder surface 32 forms a tangent to the circular arc that defines the round shape of the individual corner surface.

It should be pointed out that the two concave sliding surfaces, e.g. the sliding surfaces 27a, 27b, which are connected to a common stop surface 28, have an identical although mirror-inverted shape. In an analogous way, two corner surfaces on the eccentric body, e.g. 34a, 34d, connecting to a common shoulder surface 32 have also an identical, although mirror-inverted shape.

In FIG. 6, DL designates a diagonal along which the eccentric body has its greatest extension in cross section. In other words, the length of the diagonal is greater than the height H2 as well as the length L. In the example, the length of the diagonal DL amounts to 4.01 mm, implying that the same is approx. 2.5% greater than L. In practice, the length of DL should be at most 5% greater than L.

In FIGS. 5 and 6, it should also be noted that the individual shoulder surface 32 has a width W3 that is smaller than the width W2 of the individual stop surface. In the example, W3 amounts to 0.56 mm, while W2 amounts to 0.78 mm. The fact that the transition surface 31 (see FIG. 5) has a greater radius R2 than the individual, concave sliding surface 27 means that the convex corner surface 34—upon rotation of the eccentric body—can be slipped inward toward the sliding surface 27 without encountering any sharp edge.

It should be evident that the individual, convex corner surface 34 on the eccentric body, thanks to its eccentric situation (MP2) in relation to the center C2 of the eccentric body, already by its eccentricity provides a deflection of the clamping finger. However, it should be noted that the diagonal DL represents the greatest extension of the cross-section. Thus, DL is 4.01 mm long, i.e., 0.10 mm greater than the length L of the major axis SA2, and 0.51 mm greater than the height H2. The consequence of this fact will be clear in the context of FIGS. 8-12.

Reference is now made to FIG. 7, which illustrates the weakening, circular hole 15 that is situated behind the keyhole 13. The center C3 of the hole 15—which is the mid-point of the circle—is situated on a certain level above the center C1 of the keyhole. In the example, the level difference e amounts to 0/18 mm. This level displacement entails the advantage that the elastic zone 16 obtains an optimized height at the same time as the weak section vertically down from the hole 15 obtains a maximum strength. It should also be noted that the c/c distance between the centers of the holes 13 and 15 amounts to 5.0 mm.

Reference is now made to FIGS. 8-12, which illustrate the function and advantages of the tool according to the present disclosure.

Figure 8:
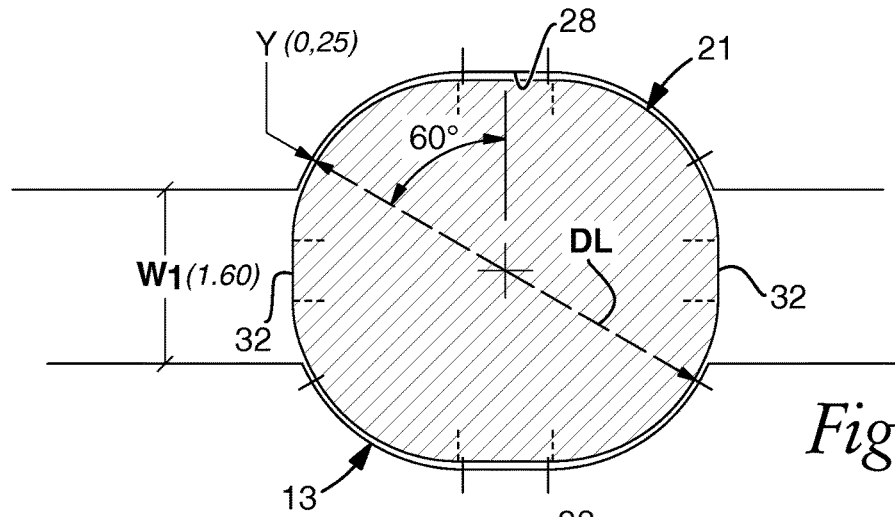
FIGS. 8-12 are a series of cross-sections showing the eccentric body in different rotary positions in relation to the keyhole.

In FIG. 8, it is seen that the eccentric body 21 in an initial position clears from the interior of the keyhole 13 by a circumferential play Y, which in the example amounts to approx. 0.25 mm. In this state, the seat 8 is assumed to be empty and the clamping finger 10 unloaded, the width W1 of the gap 12 amounting to 1.60 mm. As seen in FIG. 6, the diagonal DL extends at an angle of 60° to the minor axis LA2 (and 30° to the major axis SA2).

Figure 9:
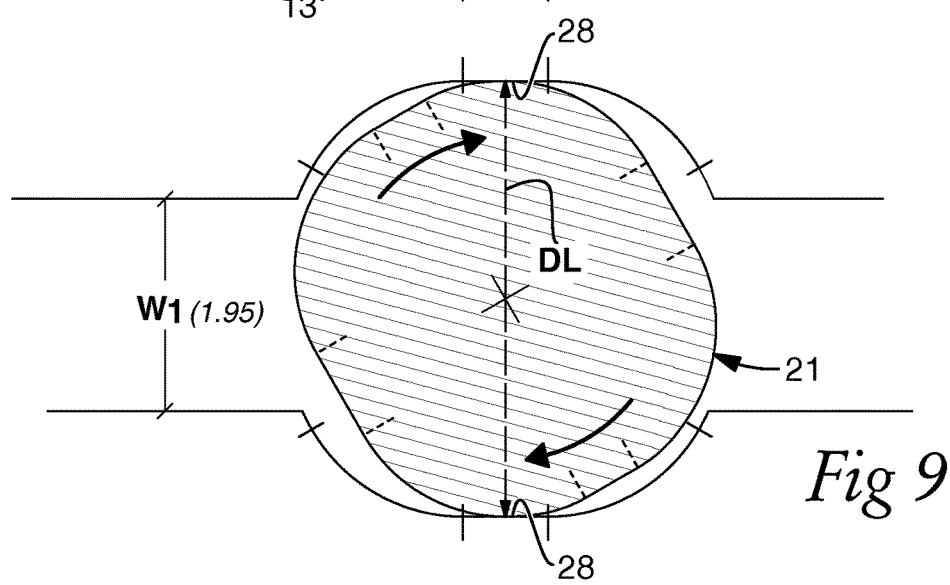

In FIG. 9, the eccentric body 21 is shown rotated 60° clockwise in relation to the position according to FIG. 8. In this position, the round corner surfaces of the eccentric body have been pressed against the flat stop surfaces 28, the width of the gap 12 being increased from 1.60 to 1.95 mm, i.e., by 0.35 mm. This represents a maximum deflection of the clamping finger and a maximum expansion of the seat 8, e.g. in the order of 0.20 to 0.25 mm.

Figure 10:
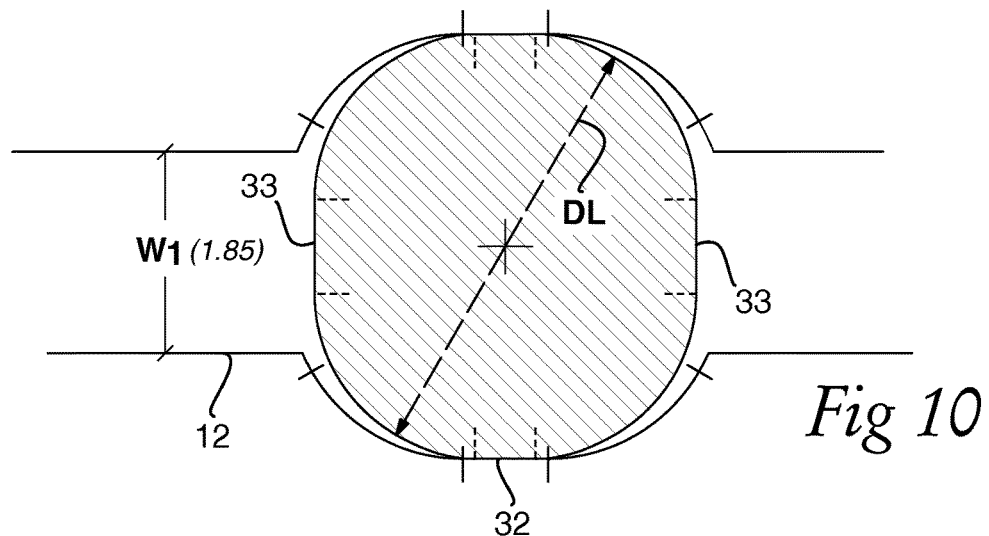

When the eccentric body is rotated a further 30° to the position shown in FIG. 10, the two flat shoulder surfaces 32 on the eccentric body will be pressed against the likewise flat, although wider stop surfaces 28. In this connection, the width W1 of the gap 12 will be reduced from 1.95 mm to 1.85 mm. In this state, the seat 8 is still "open" for the receipt of the cutting insert 4. Only when the eccentric body returns to the initial position according to FIG. 8, the width W1 of the gap will be reduced so far that the clamping finger clamps the cutting insert in the seat by a certain undersize.

Figure 11:
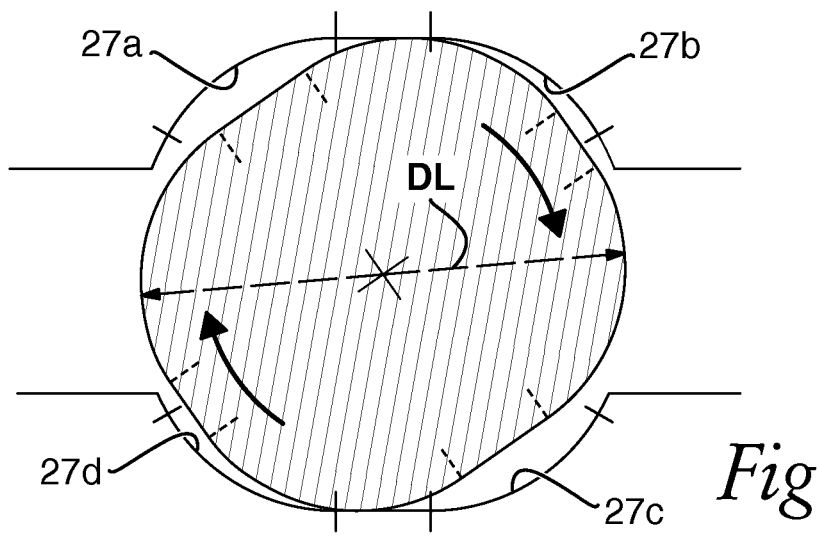
Figure 12:
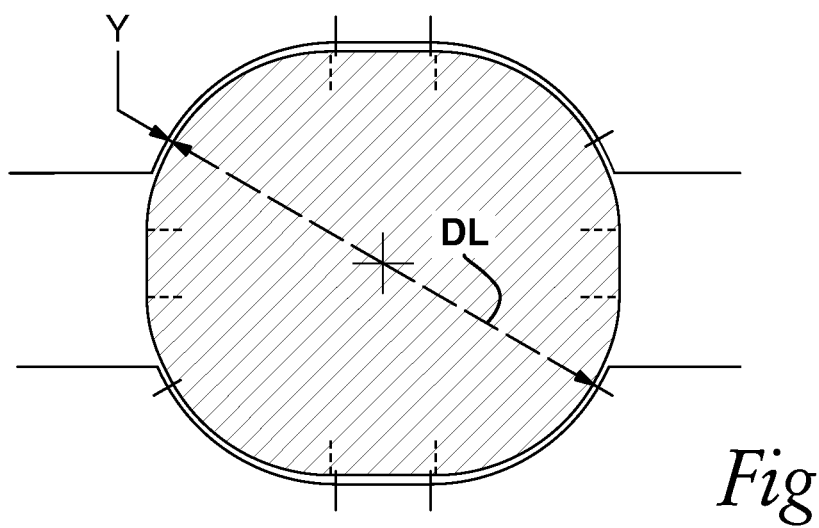

The eccentric body may be rotated back 90° to the initial position according to FIG. 8. As seen in FIGS. 11 and 12, it is, however, also feasible to proceed the rotation clockwise to the position according to FIG. 12, in which the clamping finger again clamps the cutting insert.

Although the rotation of the eccentric body 21 is carried out around the center C2 thereof (clockwise or counter-clockwise), it should be observed that the deflection of the clamping finger is carried out by means of the lever, which geometrically is represented by the diagonal DL, and that the opposite ends thereof drift along the two diametrically opposed sliding surfaces, e.g. 27a and 27c, of the keyhole. This means that the deflection of the clamping finger becomes comparatively large for a given angle of rotation and that the manual power on the key, which is required to rotate the eccentric body 90° from the initial position according to FIG. 8 to the seat-opening position according to FIG. 10, becomes comparatively large. The fact that the end points of the lever drift along the sliding surfaces also means that the point of action for the deflecting force against the clamping finger is located differently far out from the bending zone 16. Thus, the point of action is situated comparatively far from the bending zone when DL is rotated between the sliding surface 27a and the stop surface 28, but closer to the bending zone 16 when DL is rotated between the stop surface 28 and the sliding surface 27b. In other words, the deflection occurs easier in the first-mentioned case than in the last-mentioned one.

As seen in FIG. 3, the key 20 may be formed with one or more eccentric bodies 21a in addition to the one 21 situated closest to the end of the branch 23. By giving the different eccentric bodies' different dimensions and/or shape, one and the same key may be used for blades having different dimensions and keyholes having different size and/or shape. In such a way, the number of keys is reduced for serving different tools.

A substantial advantage is that the contact between the eccentric body and the edge surfaces in the two recesses of the keyhole will be gentle while guaranteeing a long service life of the blade as well as the eccentric body. The fact that the two stop surfaces of the keyhole have a width that is smaller than the radius of curvature of the individual sliding surface means that the area of the keyhole and eccentric body will be limited, more precisely to such an extent that the cross-sectional shape approaches the circular one. Thus, the required eccentricity is provided by means of such a diminutive difference between the major and minor axes of the eccentric body as tenths of a millimeter (in the example 0.41 mm).

Another advantage is the freedom to apply the key in several different positions, something which decreases the dependence on the environment of the tool. Thus, the key may on one hand be applied from either of the two opposite sides of the blade and with the branch of the key pointing either outward or inward from the center of the keyhole. In addition, the key may be turned either clockwise or counter-clockwise from the initial position, in which the cutting insert is kept clamped in the seat, to an opening position. In the last-mentioned position, the key is in addition reliably retained as a consequence of the fact that the shoulder surfaces on the eccentric body and the stop surfaces in the keyhole are pressed against each other. In practice, this means that the operator can carry out an insert replacement without needing to worry about the risk of the key being dislodged and of the clamping finger unintentionally being bent inward. The fact that the eccentric body and the keyhole have a cross-sectional shape approaching round shape means that a minimum of material has to be removed from the blade. In other words, the keyhole does not appreciably intrude on the strength of the blade. To the last-mentioned advantage, contributes also the fact that the material-weakening hole—when such a one is required—is situated on a higher level than the keyhole. This means that the weak section of the blade becomes comparatively strong. An advantage significant for the operator is in addition that the eccentric body, during its rotation from the position (FIG. 9), in which the deflection is maximum, to the position (FIG. 10), in which the key is arrested in a position of rest, moves fast (and automatically by the force from the clamping finger) to a position of rest. This concluding rotary motion is easily perceived not only in a tactile way but also auditory in the form of a clear click sound. In other words, the operator obtains a distinct affirmation of the key having assumed its position of rest.

The keyhole does not necessarily need to have an elongate or rectangular shape. Provided that the play between the eccentric body and the sliding surfaces in the keyhole is made sufficiently large, the keyhole may accordingly be given a genuinely circular shape so far that the four sliding surfaces are located along a common circle. It is also feasible to modify the eccentric body so far that one, the rear half thereof is made as a semi-cylindrical surface for the interaction with two rear, quarter-cylindrical surfaces in the keyhole, the other, front half of the eccentric body being formed with at least one and preferably two round corner surfaces, which are eccentric in relation to the fulcrum of the body. The eccentric body can then be rotated around its center with the semi-cylindrical surfaces in contact with each other at the same time as the individual corner surface can be rotated 90° so that the flat shoulder surface is pressed against a stop surface in the keyhole. In such an embodiment, the lever that is required to deflect the clamping finger will be represented by a circle radius and not by a twice as long diagonal.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A tool for chip removing machining, comprising:
a blade having a seat, the seat receiving a replaceable cutting insert and being delimited between a bottom support and an elastically resilient clamping finger, which is spaced-apart from the rest of the blade via a slit, which mouths in a keyhole; and
a key including an eccentric body arranged to be received in the keyhole for turning out the clamping finger while expanding the seat against an action of an inherent elasticity of a material of the blade, the keyhole including upper and lower recesses defined by edge surfaces, the edge surfaces including arched, concave sliding surfaces and round, convex corner surfaces disposed on the eccentric body moveable between positions in which the seat is widened or narrowed, respectively, wherein at least one of the concave sliding surfaces of the keyhole borders on a flat stop surface having a width that is smaller than a radius of curvature of an individual sliding surface, and against which a flat shoulder surface of the eccentric body bordering on the convex corner surface is pressed in the widened state of the seat, the edge surfaces of the upper and lower recesses of the keyhole each including a flat stop surface and two concave sliding surfaces situated on both sides of the same, the concave sliding surfaces each having an identical, mirror-inverted shape, and the eccentric body of the key having an elongate cross-section having a rectangular basic shape, with four round corner surfaces, the basic shape being defined by a major axis running between two flat shoulder surfaces, and a minor axis running between two long sides, said major and minor axes intersecting each other in a center, from which all four, convex corner surfaces are equidistantly spaced apart, a distance between the flat shoulder surfaces of the eccentric body being greater than a distance between the two stop surfaces of the keyhole when the clamping finger is unloaded, and smaller than a distance between two end points on a diagonal of the eccentric body, the eccentric body having its greatest extension along the diagonal.

2. A tool according to claim 1, wherein the edge surface of at least one upper or lower recess includes two concave sliding surfaces having an identical, mirror-inverted shape on both sides of the flat stop surface, the eccentric body including two convex corner surfaces having an identical, mirror-inverted shape on both sides of the shoulder surface, the convex shape of the corner surfaces being defined by circular arcs, mid-points of the circular arcs being spaced apart from a geometrical center, around which the eccentric body is rotatable.

3. A tool according to claim 1, wherein the major axis of the eccentric body has a length between said shoulder surfaces that is at most 20% greater than the length of the minor axis between the long sides.

4. A tool according to claim 3, wherein the length of the diagonal is at most 5% greater than the length of the major axis.

5. A tool according to claim 2, wherein the keyhole, via a second, rear slit, transforms into a circular hole for weakening the blade in a zone, in which bending of the clamping finger should occur, a mid-point of the hole being situated on a higher level than the center of the keyhole.

6. An insert-holding blade for a tool for chip removing machining, comprising a seat delimited between a bottom support and an elastically resilient clamping finger spaced-apart from the rest of the blade via a slit mouthing in a keyhole and being turnable against the action of an inherent elasticity of a material of the blade, the keyhole including upper and lower recesses defined by edge surfaces, in which arched, concave sliding surfaces are included, wherein at least one of the concave sliding surfaces of the keyhole borders on a flat stop surface having a width that is smaller than a radius of curvature of an individual sliding surface, at least one of the upper and lower recesses including at least two concave sliding surfaces having an identical, mirror-inverted shape on both sides of the stop surface, wherein the edge surfaces of the upper and lower recesses each include a stop surface located on both sides of the concave sliding surfaces and having an identical, mirror-inverted shape.

7. The blade according claim 6, wherein the keyhole, via a second, rear slit, transforms into a circular hole having the purpose of weakening the blade in a zone, in which bending of the clamping finger should occur, a mid-point of the edge surface of the hole being situated on a higher level than the center of the keyhole.

8. A key for a tool for a chip removing machining comprising at least one eccentric body having a basic shape including a plurality of round, convex corner surfaces eccentrically situated in relation to a center of the eccentric body, each convex corner surface bordering on a flat shoulder surface having a width smaller than a radius of curvature of the respective corner surface, the basic shape being defined by a major axis-running between two flat shoulder surfaces, and a minor axis running between two long sides, and said major and minor axes intersecting each other at a center from which all four, convex corner surfaces are equidistantly spaced apart, a distance between the shoulder surfaces being greater than a length of the minor axis between the two long sides and smaller than a length of a diagonal, the eccentric body having its greatest extension along the diagonal, wherein the major axis of the eccentric body has a length between said shoulder surfaces that is at most 20% greater than the length of the minor axis between the long sides.

9. The key according to claim 8, wherein the eccentric body includes two convex corner surfaces having an identical, mirror-inverted shape on both sides of the flat shoulder surface, the convex shape of the corner surfaces being defined by circular arcs, mid-points of the circular arcs being spaced apart from the center of the eccentric body.

10. The key according to claim 8, wherein the eccentric body has a generally rectangular basic shape having four round corners forming the convex corner surfaces.

11. The key according to claim 10, wherein the length of the diagonal is at most 5% greater than the length of the major axis.

* * * * *